US007755226B2

(12) United States Patent
Duchemin et al.

(10) Patent No.: US 7,755,226 B2
(45) Date of Patent: Jul. 13, 2010

(54) STAND FOR A LINEAR ELECTRIC MOTOR COMPRISING THERMAL COMPENSATION AND COOLING MEANS

(75) Inventors: Guillaume Duchemin, Octeville sur Mer (FR); Didier Mougin, Octeville sur Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 113 days.

(21) Appl. No.: 12/297,770

(22) PCT Filed: Apr. 17, 2007

(86) PCT No.: PCT/EP2007/053699

§ 371 (c)(1),
(2), (4) Date: Nov. 7, 2008

(87) PCT Pub. No.: WO2007/122135

PCT Pub. Date: Nov. 1, 2007

(65) Prior Publication Data

US 2009/0127410 A1    May 21, 2009

(30) Foreign Application Priority Data

Apr. 20, 2006    (FR) .................................. 06 51393

(51) Int. Cl.
*H02K 41/02*    (2006.01)
(52) U.S. Cl. .............. 310/12.24; 310/12.01; 310/12.23; 310/12.09
(58) Field of Classification Search ................... 248/637
See application file for complete search history.

(56) References Cited

U.S. PATENT DOCUMENTS

| | | | | | |
|---|---|---|---|---|---|
| 4,839,545 | A | * | 6/1989 | Chitayat | 310/12.23 |
| 4,916,340 | A | * | 4/1990 | Negishi | 310/12.13 |
| 5,073,734 | A | * | 12/1991 | Combette | 310/65 |
| 5,701,042 | A | * | 12/1997 | Takei | 310/12.01 |
| 5,723,917 | A | * | 3/1998 | Chitayat | 310/12.23 |
| 5,783,877 | A | * | 7/1998 | Chitayat | 310/12.33 |
| 5,850,112 | A | * | 12/1998 | Sienz et al. | 310/12.29 |
| 5,998,890 | A | * | 12/1999 | Sedgewick et al. | 310/12.21 |
| 6,114,781 | A | * | 9/2000 | Hazelton et al. | 310/12.29 |
| 6,469,406 | B1 | * | 10/2002 | Hwang et al. | 310/12.29 |

(Continued)

FOREIGN PATENT DOCUMENTS

DE    103 20 553    12/2004

(Continued)

OTHER PUBLICATIONS

International Search Report dated Jun. 8, 2007, in PCT application.

*Primary Examiner*—J. Allen Shriver, II
*Assistant Examiner*—Alaeddin Mohseni
(74) *Attorney, Agent, or Firm*—Young & Thompson

(57) ABSTRACT

The invention concerns a stand (12) for a linear electric motor (14) comprising a primary winding (18) and a secondary winding (20), characterized in that the stand (12) comprises compensating means (52) consisting of elongated slots (58) delimiting connecting bridges (60) and in that said slots (58) constitute cooling openings through which is provided a forced air flow when the stand (12) is moving enabling the primary winding (18) to be cooled.

12 Claims, 1 Drawing Sheet

U.S. PATENT DOCUMENTS

| | | | |
|---|---|---|---|
| 6,472,779 B2 * | 10/2002 | Hwang et al. | 310/12.29 |
| 6,515,381 B1 * | 2/2003 | Novak et al. | 310/12.06 |
| 6,661,124 B1 * | 12/2003 | Seki et al. | 310/12.21 |
| 6,661,130 B2 * | 12/2003 | Yamazaki et al. | 310/12.14 |
| 6,664,665 B2 * | 12/2003 | Hsiao | 310/12.14 |
| 6,789,305 B2 * | 9/2004 | Seki et al. | 29/596 |
| 6,822,350 B2 * | 11/2004 | Hoppe | 310/12.29 |
| 7,218,020 B2 * | 5/2007 | Emoto | 310/12.04 |
| 7,282,821 B2 * | 10/2007 | Kubo et al. | 310/12.15 |
| 7,414,336 B2 * | 8/2008 | Binnard | 310/16 |
| 7,548,303 B2 * | 6/2009 | Sogard | 355/72 |
| 7,622,832 B2 * | 11/2009 | Moriyama | 310/12.24 |
| 2002/0047314 A1 * | 4/2002 | Takedomi | 310/12 |
| 2003/0111915 A1 * | 6/2003 | Baccini | 310/12 |
| 2005/0258688 A1 * | 11/2005 | Miyamoto et al. | 310/12 |
| 2006/0049700 A1 | 3/2006 | Moriyama | |
| 2009/0261663 A1 * | 10/2009 | Aso et al. | 310/12.02 |

FOREIGN PATENT DOCUMENTS

| | | |
|---|---|---|
| DE | 10320553 A1 * | 12/2004 |
| WO | 02/063749 | 8/2002 |
| WO | WO02063749 A1 * | 8/2002 |

* cited by examiner

STAND FOR A LINEAR ELECTRIC MOTOR COMPRISING THERMAL COMPENSATION AND COOLING MEANS

The present invention relates to a stand for a linear electric motor comprising means of thermal compensation for the expansion of the stand and of cooling.

The present invention relates more particularly to a stand for a linear electric motor comprising a primary and a secondary, the stand extending with the primary in a vertical plane and being mounted movable longitudinally by means of guide means on a structure comprising the secondary, the stand comprising a central plate to which the primary is secured and which is connected respectively via a first connection portion to a first upper wing and via a second connection portion to a second lower wing, each of the wings comprising a portion of the means for guiding the stand relative to the structure which comprises the other matching portion of the guide means, the stand comprising means for compensating for the thermal expansion of the stand in order to absorb the thermal expansion of the material of the stand caused by the heating of the primary in operation.

Many stands are known for a linear electric motor, notably a linear motor of the "flat" type.

Specifically, such motors are capable of being used industrially in many applications, in particular for carrying out transfer or conveyance operations in machines.

Linear motors in particular make it possible to obtain in operation substantial accelerations, a high speed of movement and a great accuracy in positioning.

However, for certain applications, problems of premature wear of the guide means have been noted, in particular when such linear motors are used in a machine for carrying out transfer operations that are successive and sometimes repeated at high rates.

These wear problems are notably the source of frequent and costly interventions of maintenance of the machines which additionally require the machines to be stopped.

The object of the present invention is to propose a stand making it possible in particular to solve the aforementioned disadvantages.

For this purpose, the invention proposes a stand for a linear motor of the type described above, characterized in that the compensation means consist of oblong slots delimiting connection bridges and in that the slots form cooling vents through which a forced air circulation takes place during the movement of the stand allowing the primary to be cooled by convection.

Advantageously, the slots of the stand according to the invention form means of compensating for the thermal expansion of the stand and means for cooling said stand so as respectively to absorb and limit the thermal expansion of the material of the stand caused by the heating of the primary in operation.

Advantageously, the compensation means according to the invention make it possible to absorb the thermal expansion of the material of the stand by conferring thereon locally an elastic zone having a capacity of deformation capable of compensating for the thermal expansion.

According to other features of the invention:
- the compensation means consisting of the slots are capable of absorbing the thermal expansion of the material of the stand in a determined direction which is orthogonal to the direction of movement of the stand in order to limit the transmission of forces to the guide means;
- the slots forming the means for compensating for the thermal expansion of the stand are arranged in the first connection portion and second connection portion of the central plate with each of the wings, the upper wing and the lower wing;
- the slots extend parallel to one another and over all or a portion of the length of the connection portions of the stand;
- the stand comprises an inner housing in which the primary is received, said housing being open longitudinally at each of its ends and transversely in the direction of the secondary arranged opposite;
- the stand has, in vertical section via a transverse plane, a central portion that is generally "U"-shaped delimiting the housing and whose central vertical plate forms the intermediate branch connecting to the parallel branches formed by the upper connection portion and lower connection portion which extend generally horizontally;
- the slots extend transversely in a rectilinear manner in the upper connection portion and lower connection portion of the stand;
- the structure belongs to a machine, such as a packaging machine, and means of transfer of the machine are attached to the outer vertical face of the stand which is capable of driving said transfer means longitudinally.

Other features and advantages of the invention will appear on reading the following detailed description for the understanding of which reference should be made to the appended drawings in which.

In the following description, identical reference numbers indicate parts that are identical or have similar functions.

The description of the invention will adopt, in a nonlimiting manner and in order to make it easier to understand, the longitudinal, vertical and transverse orientations according to the indication L, V, T indicated in the figures and in which the vertical orientation does not necessarily refer to the direction of gravity.

Figure 1:
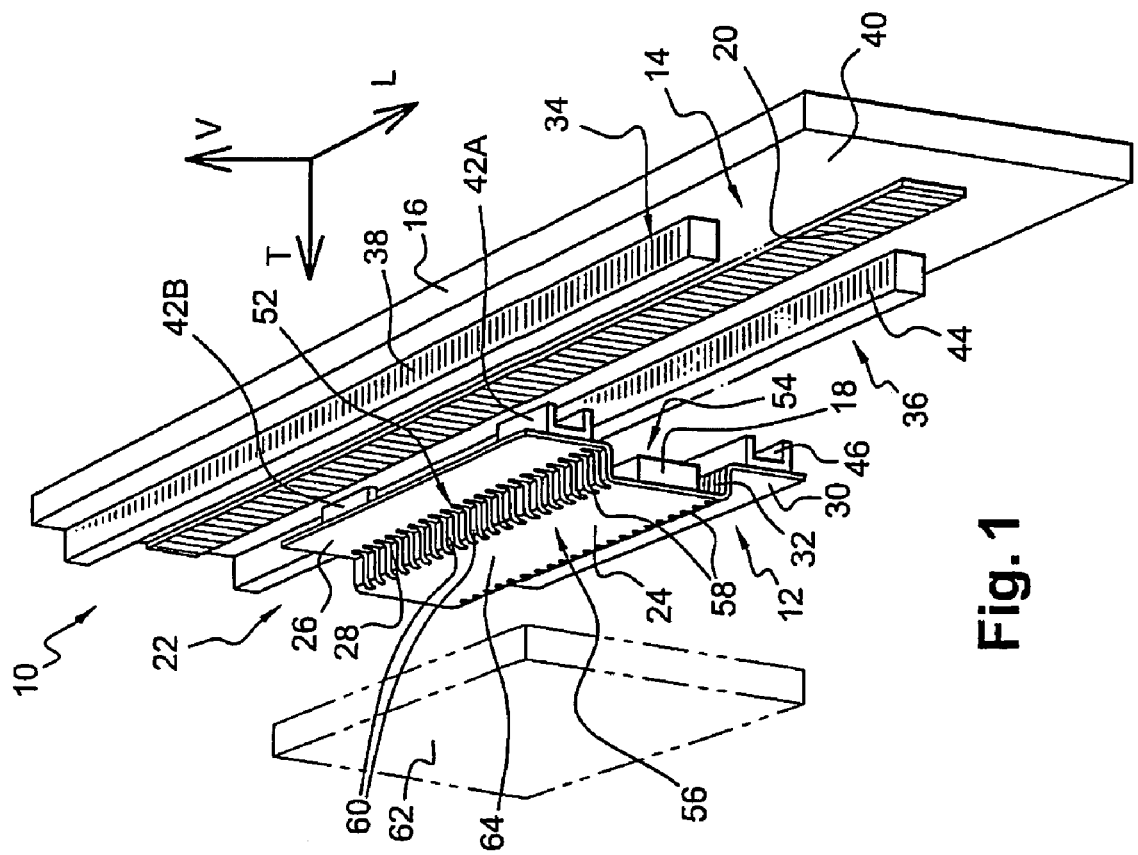
FIG. 1 is a view in perspective which represents schematically in an exploded manner an arrangement comprising a linear motor and a stand according to the Invention which is mounted so as to move on a structure.

FIG. 1 represents an arrangement 10 comprising mainly a stand 12 for a linear motor 14 according to a preferred embodiment of the invention and a portion of a structure 16, such as a frame of a machine (not shown).

The linear electric motor 14 is a linear motor of the "flat" type which consists respectively of a primary 18 of generally parallelepipedal shape and a secondary 20.

Preferably, the primary 18 is secured to the stand 12 so as to form an item of equipment that can be moved relative to the structure 16 to which the secondary 20 is secured.

Depending on the indicator (L, V, T) represented in the figures, the stand 12 supporting the primary 18 in this instance extends generally in an average plane of vertical orientation.

The secondary 20 is arranged vertically and transversely opposite the primary 18 at a distance corresponding to a determined air gap value "e".

The secondary 20 in this instance extends in a rectilinear manner in the longitudinal direction to form a magnet path determining the path of movement of the stand 12 and of the primary 18 relative to the structure 16.

The stand 12 is mounted so as to move on the structure 16 relative to which it moves horizontally in the longitudinal direction by means of the guide means 22.

The guide means 22 are arranged between the stand 12 and the structure 16, on either side of the secondary 20.

The stand 12 comprises a central plate 24 to which the primary 18 is secured, which is connected respectively to a first wing, called the upper wing, 26 via a first connection portion 28 and to a second wing, called the lower wing, 30 via a second connection portion 32.

The guide means 22 of the stand 12 comprise guide means, called upper guide means, 34 and guide means, called lower guide means, 36.

The upper guide means 34 and the lower guide means 36 are in this instance identical and advantageously of the "ball guide" type.

Each of the guide means 22 comprises respectively a first fixed portion consisting of a longitudinal rail fastened to the structure 16 and a movable portion which is capable of sliding on the rail and which consists of at least one skid mounted secured to one of the wings 26, 30 of the stand 12.

The upper guide means 34 comprise an upper longitudinal rail 38 which is attached to a vertical face 40 of the structure and a pair of upper skids 42, respectively a front upper skid 42A and a rear upper skid 42B.

In the same manner, the lower guide means 36 comprise a lower longitudinal rail 44 which is attached to the vertical face 40 of the structure 16 and a pair of lower skids 46, respectively a front lower skid and a rear lower skid (not shown).

Figure 2:
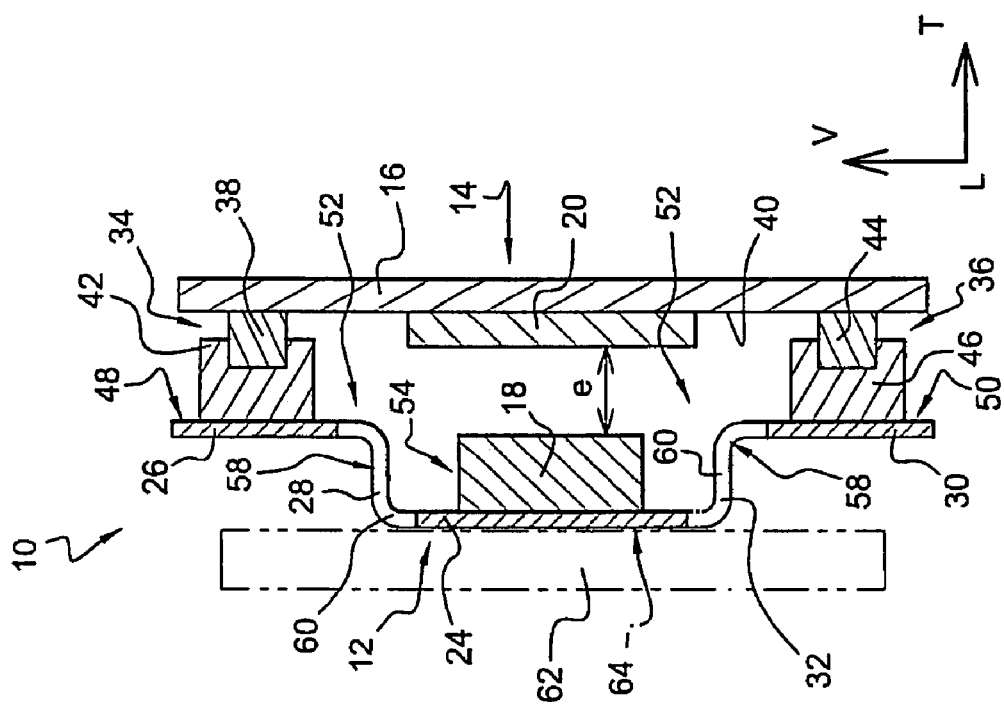
FIG. 2 is a view in cross section along a vertical plane of the arrangement of FIG. 1 represented in the assembled position.

As can be better seen in FIG. 2, the upper skids 42 are mounted secured to the inner vertical face 48 of the upper wing 26 and the lower skids 46 are mounted secured to the inner vertical face 50 of the lower wing 30 of the stand 12.

Therefore, each of the wings, the upper wing 26 and the lower wing 30, comprises respectively a pair of skids 42, 46 forming the movable portion of the guide means 22 designed to guide the stand 12 relative to the longitudinal rails 38, 44 of the structure 16.

The guide means 22 of the stand 12 comprise no clearance, that is to say that the skids are not mounted "floating" relative to the rails, so that the means 22 do not comprise any clearance at least in the vertical direction.

Therefore, when the stand 12 makes repetitive movements, such as back and forth, the primary 18 heats up and then transmits heat by conduction to the stand 12.

Depending on the applications, the stand 12 is capable of reaching temperatures of the order of 64° C. to 90° C. which cause phenomena of thermal expansion of the material of the stand 12.

Under the effect of the thermal expansion of the material, the stand 12 tends to deform, which causes the appearance of vertically oriented pressure forces which are applied respectively upward on the upper guide means 34 and downward on the lower guide means 36.

These "parasitic" forces due to the thermal expansion of the material are therefore exerted orthogonally to the longitudinal direction of movement of the stand 12 determined by the rails 38, 44.

These forces notably cause premature wear of the guide means 34, 36 and are sometimes capable of affecting the guidance of the stand 12.

Advantageously, the stand ~12 therefore comprises means 52 of compensation for the thermal expansion of the stand 12 so as to absorb the thermal expansion of the material of the stand caused by the heating of the primary 18 in operation.

Preferably, the compensation means 52 are capable of absorbing the thermal expansion of the stand in a determined direction, in this instance vertical, which is orthogonal to the longitudinal direction of movement of the stand 12 in order to limit the transmission to the upper guide means 34 and lower guide means 36 of the vertical pressure forces due to the expansion of the stand 12, in particular of the expansion of the central plate 24 which is in contact with the primary 18.

Advantageously, the compensation means 52 of the stand 12 are capable of compensating for the thermal expansion of the material when the primary 18 heats up so that the guide means 22 of the stand 12 are not or not very much affected by these forces.

According to the invention, the compensation means 52 consist of oblong slots 58 delimiting connection bridges 60 and the slots 58 form cooling vents through which a forced air circulation takes place during the movement of the support 12 allowing the primary 18 to be cooled by convection.

Thanks to the invention, this extends the operating period of the guide means 22 and reduces the necessary maintenance operations.

Preferably, the slots 58 forming the means 52 of compensating for the thermal expansion of the stand are arranged in the first connection portion 28 and second connection portion 32 of the central plate 24 with each of the wings, the upper wing 26 and lower wing 30.

According to an exemplary embodiment of the stand 12 represented in FIGS. 1 and 2, the stand 12 comprises an inner housing 54 in which the primary 18 is received, said housing 54 being open longitudinally at each of its ends and transversely in the direction of the secondary 20 arranged opposite on the structure 16.

Therefore, the stand 12 has, in vertical section via a transverse plane, a central "U"-shaped portion 56 which delimits the housing 54 and of which the central plate 24, in this instance vertical, forms the intermediate branch connecting to the parallel branches formed respectively by the upper connection portion 28 and lower connection portion 32 which in this instance extend generally horizontally.

According to the invention, the compensation means 52 consist of a plurality of slots 58 delimiting the connection bridges 60.

More precisely, each connection bridge 60 is delimited longitudinally by two consecutive slots 58.

As can be better seen in the section of FIG. 2, the slots 58 are oblong and, in section, are generally "S"-shaped.

The slots 58 therefore comprise a main central portion extending transversely in the assembly of the upper connection portion 28 and lower connection portion 32 and extending vertically respectively in the adjacent portion of the central plate 24 and in the adjacent portion of each of the wings, the upper wing 26 and lower wing 30.

Preferably, the slots 58 extend parallel to one another and over all or part of the length of the upper connection portion 28 and lower connection portion 32.

The slots 58 in this instance extend transversely in a rectilinear manner in the upper connection portion 28 and lower connection portion 32 of the stand 12.

Advantageously, the slots 58 form cooling vents through which a "forced" air circulation takes place during the movement of the stand 12 allowing the primary 18 and the stand 12 to be cooled by convection.

As a variant (not shown), the stand 12 comprises additional heat-dissipation means, such as fins, in order to limit the heating of the stand 12 while cooling it.

Advantageously, the stand 12 is capable of being used in a machine (not shown), such as a packaging machine, in which the arrangement 10 is for example used to produce a device (not shown) for transfer between at least two workstations.

Advantageously, the stand 12 is capable of moving transfer means 62 of such a machine, such as means for picking up a package of the carton type.

The transfer means 62 are for example mounted secured to the outer vertical face 64 of the central plate 24 of the stand 12.

Advantageously, the linear motor 14 comprises a servomotor designed to control its movement, particularly its position and speed.

Advantageously, such a transfer device comprising a linear motor makes it possible to produce a machine that is more compact than a machine comprising conventional transfer means of the type with belts or chains driven by an electric motor.

In addition, the stand 12 according to the invention makes it possible to optimize the operating period of the guide means 22, reduce the costs charged in particular to replacements of the members of the means 22 and to the frequency of the maintenance operations.

The stand 12 according to the invention consequently forms a solution that is particularly economical to apply, notably relative to a solution consisting in providing active cooling means, for example by water circulation, that is particularly bulky and costly.

The invention claimed is:

1. A stand (12) for a linear electric motor (14) comprising a primary (18) and a secondary (20), the stand (12) being mounted movable longitudinally by means of guide means (22) on a structure (16) comprising the secondary (20), the stand (12) comprising a central plate (24) to which the primary (18) is secured and which is connected respectively via a first connection portion (28) to a first upper wing (26) and via a second connection portion (32) to a second lower wing (30), each of the wings (26, 30) comprising a portion of the means (22) for guiding the stand relative to the structure (16) which comprises the other matching portion of the guide means (22), the stand (12) comprising means (52) for compensating for the thermal expansion. of the stand (12) in order to absorb the thermal expansion of the material of the stand (12) caused by the heating of the primary (18) in operation, characterized in that the compensation means (52) consist of oblong slots (58) delimiting connection bridges (60) and in that the slots (58) form cooling vents through which a forced air circulation takes place during the movement of the stand (12) allowing the primary (18) to be cooled by convection.

2. The stand as claimed in claim 1, characterized in that the compensation means (52) consisting of the slots (58) are capable of absorbing the thermal expansion of the material of the stand (12) in a determined direction which is orthogonal to the direction of movement of the stand (12) in order to limit the transmission of forces to the guide means (22).

3. The stand as claimed in claim 1, characterized in that the slots (58) forming the means (52) for compensating for the thermal expansion of the stand (12) are arranged in the first connection portion (28) and second connection portion (32) of the central plate (24) with each of the wings, the upper wing (26) and the lower wing (30).

4. The stand as claimed in claim 1, characterized in that the slots (58) extend parallel to one another and over all or a portion of the length of the connection portions (28, 32) of the stand (12).

5. The stand as claimed in claim 1, characterized in that the stand (12) comprises an inner housing (54) in which the primary (18) is received, said housing (54) being open longitudinally at each of its ends and transversely in the direction of the secondary (20) arranged opposite.

6. The stand as claimed in claim 5, characterized in that the stand (12) has, in vertical section via a transverse plane, a central portion (56) that is generally "U"-shaped delimiting the housing (54) and whose central vertical plate (24) forms the intermediate branch connecting to the parallel branches formed by the upper connection portion (28) and lower connection portion (32) which extend generally horizontally.

7. The stand as claimed in claim 6, characterized in that the slots (58) extend transversely in a rectilinear manner in the upper connection portion (28) and lower connection portion (32) of the stand (12).

8. The stand as claimed in claim 1, characterized in that the structure (16) belongs to a machine, such as a packaging machine, and in that means (62) of transfer of the machine are attached to the outer vertical face (64) of the stand (12) which is capable of driving said transfer means (62) longitudinally.

9. The stand as claimed in claim 2, characterized in that the slots (58) forming the means (52) for compensating for the thermal expansion of the stand (12) are arranged in the first connection portion (28) and second connection portion (32) of the central plate (24) with each of the wings, the upper wing (26) and the lower wing (30).

10. The stand as claimed in claim 2, characterized in that the slots (58) extend parallel to one another and over all or a portion of the length of the connection portions (28, 32) of the stand (12).

11. The stand as claimed in claim 2, characterized in that the stand (12) comprises an inner housing (54) in which the primary (18) is received, said housing (54) being open longitudinally at each of its ends and transversely in the direction of the secondary (20) arranged opposite.

12. The stand as claimed in claim 2, characterized in that the structure (16) belongs to a machine, such as a packaging machine, and in that means (62) of transfer of the machine are attached to the outer vertical face (64) of the stand (12) which is capable of driving said transfer means (62) longitudinally.

* * * * *